(12) United States Patent
Thyssen

(10) Patent No.: US 6,257,963 B1
(45) Date of Patent: Jul. 10, 2001

(54) GRINDING WORM FOR THE CONTINUOUS GENERATING GRINDING OF GEAR WHEELS

(75) Inventor: Wolfgang Thyssen, Bad Säckingen (DE)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/570,134

(22) Filed: May 12, 2000

(51) Int. Cl.$^7$ .................................................. B24B 19/00
(52) U.S. Cl. .............................. 451/47; 451/56; 451/443; 451/253; 451/900
(58) Field of Search ........................ 451/47, 219, 253, 451/900, 56, 443

(56) References Cited

U.S. PATENT DOCUMENTS

| | | | |
|---|---|---|---|
| 4,009,636 | * | 3/1977 | Ainoura ................................. 451/219 |
| 4,689,918 | * | 9/1987 | Loos et al. .............................. 451/253 |
| 4,961,289 | * | 10/1990 | Sulzer ..................................... 451/253 |
| 5,129,185 | * | 7/1992 | Erhardt et al. ......................... 451/900 |
| 5,379,554 | * | 1/1995 | Thurman et al. ....................... 451/47 |
| 5,954,568 | | 9/1999 | Wirz . |
| 6,077,150 | * | 6/2000 | Jankowski .............................. 451/47 |

FOREIGN PATENT DOCUMENTS

| | | |
|---|---|---|
| 661 847 | 6/1938 | (DE) . |
| 2 222 947 | 11/1972 | (DE) . |
| 4403236 A1 | 9/1994 | (DE) . |
| 94/19135 | 9/1994 | (WO) . |

* cited by examiner

*Primary Examiner*—Eileen P. Morgan
(74) *Attorney, Agent, or Firm*—Browdy and Neimark

(57) ABSTRACT

The grinding tool comprises a grinding worm flange (2) and a grinding worm (9) for the generative grinding of gears, the flange (2) being provided with location surfaces (5, 6) for the non-clearance fixture to a grinding spindle (1). The flange (2) has an outer, slightly tapered location surface (8). On this the grinding worm (9) with an appropriately tapered bore (10) is located and connected without play to the flange (2). The grinding worm (9) comprises a bearer ring (23) and a grinding body (24), wherein the deformation resistance of the bearer ring (23) is greater than that of the grinding body (24). Centrifugally induced displacements and deformations of the grinding worm (9) are thereby minimized.

20 Claims, 2 Drawing Sheets

GRINDING WORM FOR THE CONTINUOUS GENERATING GRINDING OF GEAR WHEELS

FIELD AND BACKGROUND OF THE INVENTION

This invention relates to grinding worms for the continous generating grinding of gear wheels.

Thanks to the improvements in the properties of the abrasive grain, the bond and structure, the hard fine machining of gears with single-start or multi-start grinding worms has recently undergone a high increase in production rate, and due to its high quality and increased economic efficiency gained steadily in significance in gear manufacture. In combination with the improved dynamic properties of tooth flank grinding machines as brought about by NC-techniques, systematically developed specific profiling and grinding technologies provide for high accuracy, flexibility in the shaping of even intricately modified tooth flanks, and high degree exploitation of the tools. In particular the high grinding speeds nowadays possible not only with galvanic but also with re-dressable bonds have—by the resulting increase in metal removal rate—contributed much to the increase in grinding performance and economy of this process. The centrifugal forces occurring at high grinding speeds become so great, however, that profitable grinding worms with volumetric grinding wheel structure in vitrified, synthetic resin or other volumetric bond grow outwards due to the low bond stiffness and inhomogenities in the grinding body, and on account of the inevitable out-of-balance change their shape in an uncontrollable manner, whereby due to the incurred radial and axial runout of the working surface of the grinding worm—the flanks of the worm thread—the flank accuracy of the workpiece is impaired. This effect is further increased by the fact that there is usually play between the bore of the grinding worm and the diameter of the grinding worm flange, and the grinding worm is only held by the friction of the axial clamping between the shoulder and flange cover of the grinding worm flange, in which case due to out-of-balance in the grinding body under the influence of increasing centrifugal forces a radial displacement of the grinding body can occur. It is easy to see that by re-balancing on the machine, the excitement of vibrations in the grinding spindle can be minimized, but that geometrical alterations in the grinding worm due to variable peripheral speeds cannot be compensated.

The influence on the grinding accuracy due to displacements and deformations of the grinding body caused by centrifugal force is suppressed so long as profiling can be performed at the same grinding worm speed as later grinding, so that the shape of the grinding worm thread produced when profiling is maintained when grinding. It becomes a problem, however, when the grinding speed exceeds the profiling speed, the latter being limited by the motion sequence between grinding worm and profiling tool necessary for the profiling action, or by the dynamics of the NC-axes drives producing it. This happens especially with grinding worms of very hard abrasive, e.g. CBN or diamond, and with grinding worms of small outside diameter. The problem is intensified when with single-start worms the ends of the grinding worm thread which produce the out-of-balance do not lie on the same envelopment line of the grinding worm, so that their dynamic state of balance alters with the decreasing of the grinding worm diameter caused by profiling. Modern tooth flank grinding machines are in fact provided with a balancing device on the grinding spindle. But this can only improve the balance of the set-up flange with grinding worm. Due to the differing densities of the grinding worm and the set-up flange, the radial runout of the two centres of gravity causing the out-of-balance will differ, and hence also the radial runout of their outside diameters, so that the balanced state achieved on the machine is not identical to an optimum concentricity of the grinding worm thread. Moreover the grinding machine only allows compensation of the static out-of-balance, but not the dynamic, as the balancing lugs are arranged in one plane.

One of the possibilities for avoiding this problem lies, for example, in the use of grinding worms with the galvanic bonding of the abrasive grains on a worm-shaped steel body. This is the favoured method for grinding with CBN (Cubic Boron Nitride), which is extremely wear resistant. Such grinding worms are located without play on the grinding spindle, and thanks to the material strength the thread geometry of the grinding worm remains unaltered even at high grinding speeds. They are, however, not redressable. The geometry of the grinding worm threads produced when manufacturing the grinding worm cannot therefore be modified on the grinding machine if it were desirable, and stays the same throughout the life of the coating. Another disadvantage is that the grinding behaviour of such grinding worms alters in the course of their useful life, and that to achieve a high metal removal rate on the one hand and a low workpiece surface roughness on the other, grinding worms with different grain size coatings must be employed. Furthermore specific equipment and experience is required for the galvanic coating of the grinding worms, so that after every durability period they must be recoated with fresh abrasive grains by an external tool manufacturer. For this reason the use of such grinding worms is restricted to large series production, where the high flexibility with respect to flank shape, as offered by the profiling of redressable grinding worms on the machine, can be dispensed with.

In U.S. Pat. No. 5,954,568, a process for solving the problem is proposed, in which by the use of a dressing worm coated galvanically with diamond grains, even grinding worms for high grinding speeds can be profiled at grinding speed. One of the disadvantages of this method lies in the great number of diamond dressing worms required to embrace the workpiece module range of the machine. The costs involved and the technical command over the dynamically difficult dressing process have as yet prevented this solution from becoming popular.

U.S. patent application Ser. No. 09/476 994 suggests a process in which the geometrical errors in the grinding worm deriving from the deformation caused by the difference between the profiling and grinding speeds are determined by grinding a test specimen or by the measurement of the grinding worm threads at grinding speed via a sensor, and allowing for these errors in the form of corrections in the subsequent profiling operation. This method is a sure way of solving the problem. But it is complicated, and to maintain a high workpiece accuracy the error determination must be repeated frequently as the diameter of the grinding worm threads diminishes, which demands repeated stoppage of the production process with corresponding time loss.

Another way of reducing the detrimental influence of the speed difference between profiling and grinding is described in DE 4403 236 A1 (U.S. patent application Ser. No. 204 595). In order to minimize the change in the dynamic state of balance of singlestart grinding worms occurring with diminishing diameter of the grinding worm thread, the proposal is made to dimension the grinding wheel facewidth in the worm thread zone such that the entry and exit ends of the thread lie on the same envelopment line of the grinding worm periphery, equivalent to an integer number of thread windings. This measure only solves part of the problem, however; for the influence of the bore clearance and of the inhomogenities in the grinding body are still present.

SUMMARY OF THE INVENTION

The objective of the present invention is to introduce a grinding worm that can be profiled on the grinding machine, which is devoid of the disadvantages described. This object is achieved with the present invention which, briefly stated, concerns a grinding tool comprising a grinding worm for the continous generating grinding of gear wheels. The grinding worm is connected without clearance or play to a turned part which is provided with tapered locating surfaces for a non-clearance connection with a grinding spindle. The grinding worm is composed of an inner bearer ring and a grinding body to which it is rigidly joined. The deformation resistance of the bearer ring is greater than that of the grinding body.

BRIEF DESCRIPTION OF THE DRAWINGS

Embodiments of the invention will hereinafter be described with reference to the drawings, in which.

DETAILED DESCRIPTION OF PREFERRED EMBODIMENTS

The basic principle of the solution according to the invention is to consistently avoid any clearance or play between the grinding worm and the grinding spindle, and to restrict the portion of material with low modulus of elasticity, i.e. with low resistance to deformation, to those zones of the grinding worm body which are actually required for grinding.

Figure 1:
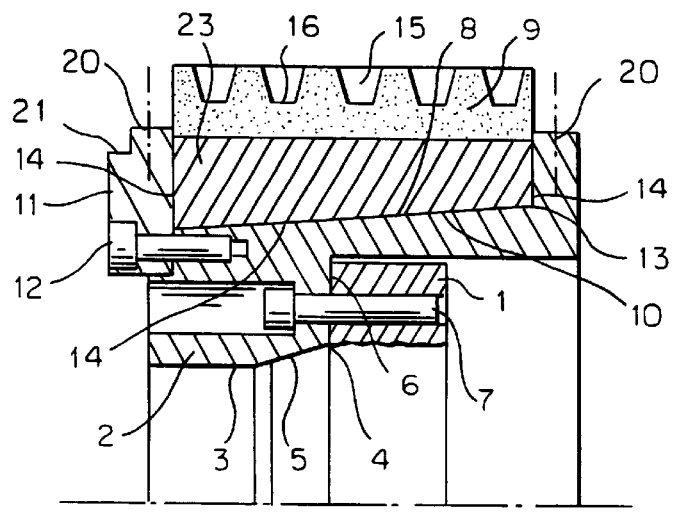
FIG. 1 shows a grinding worm with a grinding worm flange and a grinding spindle head.

The spindle head of the grinding spindle 1 in FIG. 1 is provided in known manner with a taper spigot 3 and shoulder 4 for the non-clearance accommodation of the location surfaces 5 and 6 of the grinding worm flange 2, which is bolted firmly and without clearance or play to the grinding spindle 1 with screws 7. The periphery of grinding worm flange 2 is provided with a slight outside taper 8 for the grinding worm 9, which has a corresponding tapered bore 10. The taper angle of the surface 8 and the bore 10 is preferably less than 20°. The grinding worm 9 is pulled against a shoulder 13 of the flange 2 by the flange screws 12 of the flange cover 11, itself being radially close-fit located on the flange 2. This expands the tapered grinding worm bore 10 slightly, thus assuring a non-clearance seating of the grinding worm 9 on the flange taper 8. To assure the non-clearance location of the grinding worm 9 on the grinding worm flange 2 even when the dimensional tolerance on the grinding worm body is large, firm joints 14, glue joints for example, are provided between the flange 2 and the grinding worm 9, which—when the grinding worm 9 has served its useful life—can be freed without damaging the grinding worm flange 2. The grinding worm 9 is a profitable and dressable grinding wheel of preferably extremely hard abrasive grain and minimized radial runout of the worm thread 15.

Before fitting to the grinding spindle 1, the grinding worm 9 and flange 2 are dynamically balanced in the mutually assembled state aside of the grinding machine. To this purpose, radially adjustable cylinder head screws 20 in the flange cover 11 and at the shoulder 13 of the grinding worm flange 2 serve as balancing lugs.

The flange cover 11 is provided with a gauging shoulder 21 by which, via a proximity sensor, the radial and axial runout can be inspected on the grinding machine, and the control signal generated for an automatic balancing device for the grinding spindle 1.

The embodiment of the grinding worm 9 according to the invention is adapted to the relevant case of application and the difference between the outer diameter and bore diameter of the grinding body, which body may comprise a segmented or non-segmented, axially divided or non-divided ring.

Figure 2:
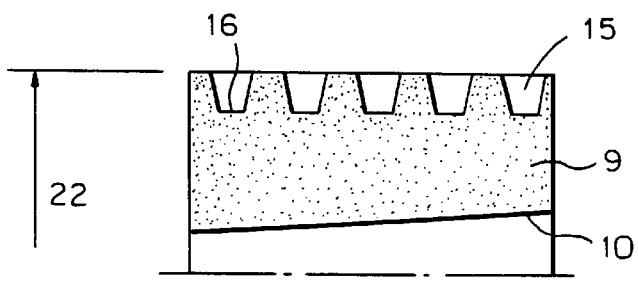
FIGS. 2 to 6 shows various kinds of design for the grinding worm according to the invention and FIG. 7 shows a second embodiment.

The grinding worm 9 depicted in its annular cross-section in FIG. 2 is a design employed with preference for multi-start grinding worms 9 with small diameter difference between outer periphery 22 and bore 10. If the grinding worm 9 is of multi-start, a facewidth adjustment to attain an integer number of windings to avoid alteration in the dynamic balance due to diminishing thread diameter when re-profiling is not necessary.

Figure 3:
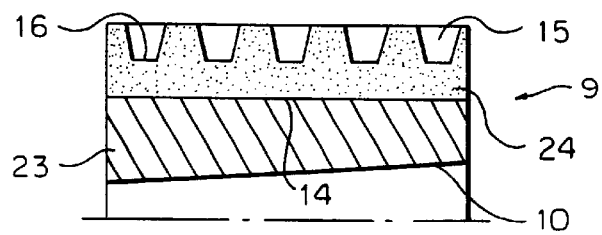

FIG. 3 depicts an axially non-divided but radially divided design for the grinding worm 9, which is employed with preference for multi-start grinding worms 9 with large difference between outer periphery 22 and bore diameter 10. In order to keep the ring cross-section portion with low deformation resistance as small as possible, the diameter difference between outer periphery 22 and bore 10 of the grinding worm 9 is bridged with a bearer ring 23 made of metal or another material of higher deformation resistance than that of the grinding body 24. The deformation of the grinding worm 9 due to the centrifugal force difference between the profiling and grinding speeds is thereby reduced to a minimum. The grinding body 24 is attached rigidly to the bearer ring 23, by further glue points 14, for example.

Figure 4:
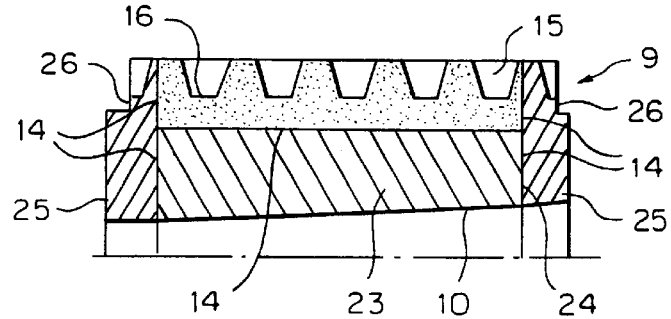

In FIG. 4 an axially and radially divided design is shown, which is employed with preference in the case of a large diameter difference between outer periphery 22 and bore 10 of single-start grinding worms 9, where as a result—to avoid change in the dynamic balance due to thread diameter reduction when re-profiling—a facewidth adaptation to aquire an integer number of windings is necessary. In addition to the bearer ring 23 of material with high deformation resistance for bridging the diameter difference between peripheral and bore diameters of the grinding worm 9, this grinding worm is provided with dummy discs 25 of machinable and dressable material of high strength compared to the grinding body 24.

These dummy discs 25 serve on the one hand to protect the lateral ends of the worm thread 15 from breaking out during profiling, and on the other hand to adapt the facewidth of the grinding worm 9 in the zone of the useful worm diameter. To this purpose, in the zone of the useful grinding worm diameter—i.e. as far as the smallest possible diameter of the thread root 16 of the grinding worm 9—the two outer faces of the dummy discs 25 are displaced axially with a turning or dressing tool so far towards the grinding body 24 that the distance between the shoulders 26 in this diameter zone is reduced to a grinding worm facewidth which supplies an integer number of grinding worm windings. The smallest possible root circle diameter of the grinding worm thread 15 is equal to the outer diameter of the flange cover 11 and the shoulder 13 (FIG. 1).

Figure 5:
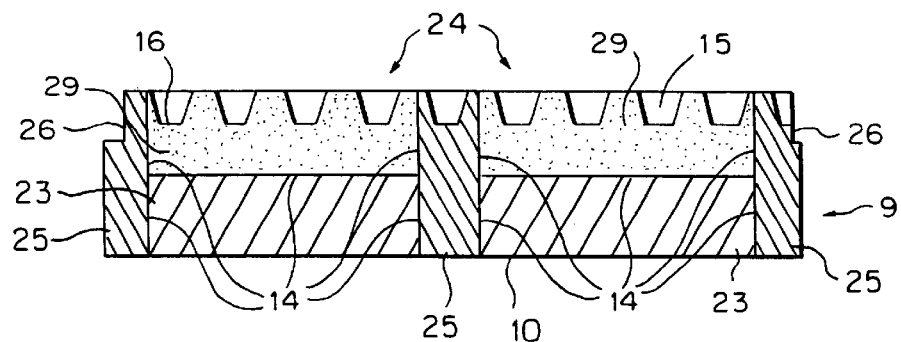
Figure 6:
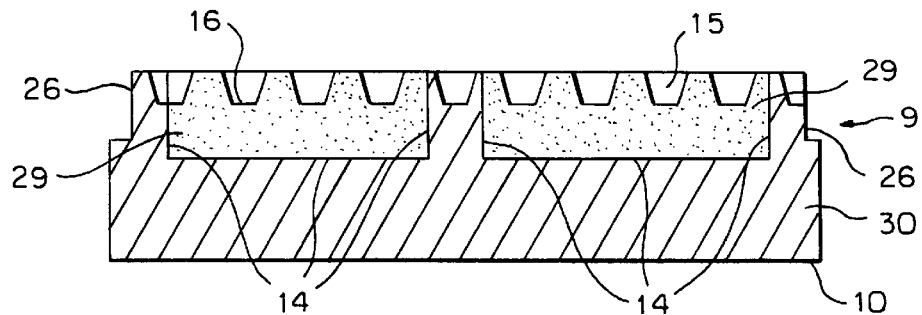

The statements concerning the design according to FIG. 4 apply also to the radially and axially severally divided designs according to FIGS. 5 and 6, which are employed to advantage for very wide grinding worms 9, and to cases in which the separate sections 29 of the grinding body 24 have differing composition specifications—e.g. for rough or fine grinding—where the bearer ring 23 and the dummy discs 25 of the design form according to FIG. 5 constitute, in the design form according to FIG. 6, a single unit 30 made of a high-strength but dressable material. This means that only divided grinding body rings can be used here.

Figure 7:
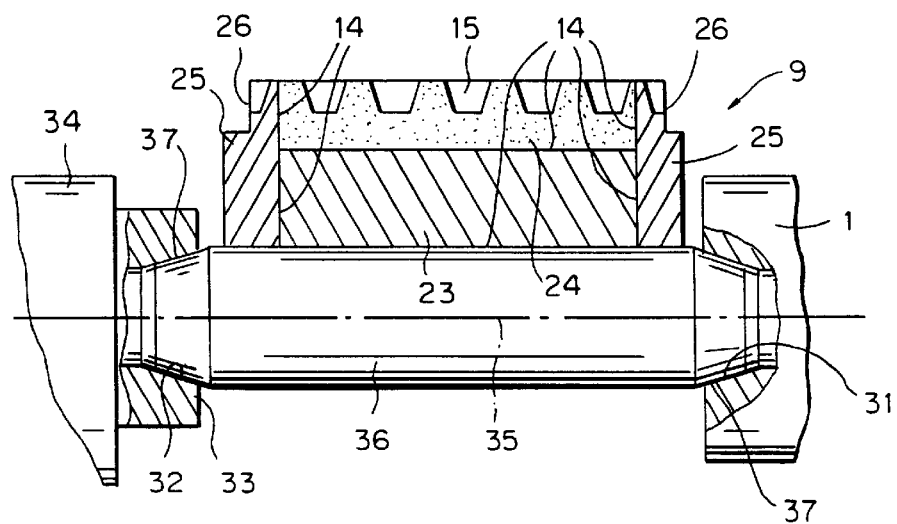

FIG. 7 depicts an embodiment of the grinding tool according to the invention, in which this is clamped without play between a first taper collet 31 in the spindle 1 and a second taper collet 32 held in a taper collet 33 of a counter-support 34 rotatable about the workpiece axis 35. The rotary drive of the tool is by way of the friction contact in the grinding spindle taper 31. In this embodiment the grinding worm 9 is borne on a cylindrical metallic tool arbor 36 provided with male tapers 37 at both ends, to which arbor it is firmly connected by a jointing medium 14—e.g. an adhesive—disconnectable without damage to the arbor 36. As an alternative to the version depicted, the tool arbor 36 and with it the bore of the bearer ring 23 can be slightly tapered in accordance with the embodiments according to FIGS. 1–6.

For the embodiment according to FIG. 7, all the variants for the grinding worm 9 according to FIGS. 2–6 are likewise applicable, whereby the bore 10 is either cylindrical or slightly tapered, depending on the design of the tool arbor 36.

What is claimed is:

1. A grinding tool comprising a grinding worm for continuous generating grinding of gear wheels,
   wherein the grinding worm is engaged to a turned part without clearance between the grinding worm and the turned part;
   the turned part having tapered locating surfaces that engage a grinding spindle without clearance between the turned part and the grinding spindle;
   wherein the grinding worm comprises a bearer ring and a dressable grinding body which is profilable on the grinding tool at an RPM less than that of the continuous generating grinding;
   the bearer ring being rigidly joined within the dressable grinding body; and
   wherein a deformation resistance of the bearer ring is greater than that of the grinding body.

2. The grinding tool according to claim 1, wherein the dressable grinding body is non-metallic.

3. The grinding tool according to claim 1, wherein the bearer ring is metal.

4. The grinding tool in accordance with claim 1, in which the grinding body comprises at least two axially divided sections.

5. The grinding tool in accordance with claim 4, in which the sections are separated by a high strength but dressable disc firmly connected to the sections.

6. The grinding tool in accordance with claim 1, wherein a high strength but dressable disc is rigidly joined to each end of the grinding body.

7. The grinding tool in accordance with claim 6, wherein the dressable discs are made as a unitary body with the bearer ring.

8. The grinding tool in accordance with claim 6, wherein the dressable disc (25) is provided with a shoulder which forms a thread winding with the grinding worm.

9. The grinding tool in accordance with claim 1, wherein engagement of the grinding worm to the turned part is further secured by adhesive means which can be disconnected without damage to the turned part.

10. The grinding tool in accordance with claim 1, wherein the turned part is a grinding worm flange, provided with an outer slightly tapered location surface, on which the grinding worm with a corresponding tapered bore is fitted and engaged without clearance to the grinding worm flange.

11. The grinding tool in accordance with claim 10, wherein a flange cover is engaged to a face of the grinding worm flange and bears against a first end of the grinding worm.

12. The grinding tool in accordance with claim 11, wherein the flange cover is provided with a gauging shoulder in order to measure a radial runout with a proximity sensor and produce control signals for automatically balancing the grinding spindle.

13. The grinding tool in accordance with claim 11, wherein the grinding worm flange is provided with a radial shoulder to bear against a second end of the grinding worm.

14. The grinding tool in accordance to claim 1,
   wherein the turned part is a metallic cylindrical arbor, the arbor having clamping tampers on opposite ends thereof that can be engaged without clearance to a support (34), and
   wherein the grinding worm is engaged on the arbor without clearance.

15. A grinding tool comprising a grinding worm for continuous generating grinding of gear wheels,
   wherein the grinding worm is engaged to a turned part without clearance between the grinding worm and the turned part;
   the turned part having tapered locating surfaces that engage a grinding spindle without clearance between the turned part and the grinding spindle;
   wherein the grinding worm comprises an inner bearer ring and a dressable grinding body which is profitable on the grinding tool at an RPM less than that of the continuous generating grinding;
   the bearer ring being rigidly joined within the dressable grinding body;
   a deformation resistance of the bearer ring being greater than that of the grinding body; and
   wherein the flange cover is provided with a gauging shoulder in order to measure a radial runout with a proximity sensor and produce control signals for automatically balancing the grinding spindle.

16. The grinding tool in accordance with claim 15, in which the grinding body comprises at least two axially divided sections.

17. The grinding tool in accordance with claim 16, in which the sections are separated by a high strength but dressable disc firmly connected to the sections.

18. The grinding tool in accordance with claim 15, wherein a high strength but dressable disc is rigidly joined to each end of the grinding body.

19. The grinding tool in accordance with claim 18, wherein the dressable discs are made as a unitary body with the bearer ring.

20. The grinding tool in accordance with claim 18, wherein the dressable disc (25) is provided with a shoulder which forms a thread winding with the grinding worm.

* * * * *